United States Patent [19]

Giddings et al.

[11] 4,400,484
[45] Aug. 23, 1983

[54] ESTERS AS PROCESSING AIDS FOR OLEFINIC NITRILE COPOLYMERS

[75] Inventors: Brandford E. Giddings, Shaker Heights; Richard J. Jorkasky, II, Bedford, both of Ohio; Kim L. Thornton, Evanston, Ill.

[73] Assignee: The Standard Oil Company, Cleveland, Ohio

[21] Appl. No.: 150,021

[22] Filed: May 15, 1980

[51] Int. Cl.$^3$ .......................... C08K 5/12; C08K 5/10; C08K 5/11
[52] U.S. Cl. .................................... 524/296; 524/520; 524/521; 524/535; 525/310; 525/313
[58] Field of Search ......... 260/31.6, 31.2 R, 31.2 XA, 260/31.6, 31.8 M, 31.8 R, 31.8 XA, 31.8 DR, 31.2 N; 525/310, 313, 5; 524/296, 520, 521, 535

[56] References Cited

U.S. PATENT DOCUMENTS

| | | | |
|---|---|---|---|
| 2,191,580 | 2/1940 | Nowak et al. | 260/31.6 |
| 2,585,884 | 2/1952 | Whetstone et al. | 260/31.6 |
| 2,697,087 | 12/1954 | Hetzel | 260/31.6 |
| 2,757,157 | 7/1956 | Hetzel | 260/31.6 |
| 2,873,200 | 2/1959 | Greenlee | 260/31.2 XA |
| 2,875,168 | 2/1959 | Smith et al. | 260/31.4 |
| 3,205,270 | 9/1965 | Jaruzelski et al. | 260/31.6 |
| 3,426,102 | 2/1969 | Solak et al. | 525/310 |
| 3,578,621 | 5/1971 | Stapfer | 260/31.6 |
| 3,586,737 | 6/1971 | Duke et al. | 525/310 |
| 3,763,278 | 10/1973 | Griffith | 525/310 |
| 3,875,069 | 4/1975 | Worschech et al. | 260/31.6 |
| 3,891,722 | 6/1975 | Miloscia et al. | 525/310 |
| 4,000,106 | 12/1976 | Isley | 260/318 DR |
| 4,038,344 | 7/1977 | Eisenbraun et al. | 525/310 |
| 4,151,151 | 4/1979 | Isley | 525/5 |
| 4,172,824 | 10/1979 | Harrington et al. | 260/31.6 |

*Primary Examiner*—Melvyn I. Marquis
*Assistant Examiner*—H. J. Lilling
*Attorney, Agent, or Firm*—David P. Yusko; Herbert D. Knudsen; Larry W. Evans

[57] ABSTRACT

It has been found that the addition of small amounts of a benzoate or acetate ester of a polyfunctional hydroxy containing compound to an olefinic nitrile copolymer composition greatly increases the flowability and processibility of these thermoplastic copolymers.

7 Claims, No Drawings

ESTERS AS PROCESSING AIDS FOR OLEFINIC NITRILE COPOLYMERS

This invention relates to improvement in the flow rate and processibility of thermoplastic copolymers of olefinic nitriles and more particularly pertains to readily flowable thermoplastic high nitrile copolymer compositions which contain small amounts of a benzoate or acetate ester of a polyfunctional hydroxy containing compound. These esters serve as internal lubricants.

The processibility of high nitrile resins is greatly improved when the resin is plasticized. However, very few processing aids are known to work in a high nitrile copolymer system. Furthermore, the addition of plasticizers to a high nitrile system normally results in a lowering of physical properties.

According to this invention, a benzoate or acetate ester of a polyfunctional hydroxy containing compound has been found to greatly improve the processibility of high nitrile copolymers without lowering the impact strength or flex modulus. These esters are dispersed in a weight ratio within the range of from about 1 to 20 parts by weight and preferably from about 2 to 10 parts by weight based on 100 parts by weight of the high nitrile copolymer to form an easily flowable thermoplastic composition.

The polymeric compositions of the present invention can be prepared by any of the known general techniques for polymerization including the bulk polymerization, solution polymerization and emulsion or suspension polymerization techniques by batch, continuous or intermittant addition of the monomers and other components. The preferred method is emulsion polymerization. The polymerization is preferably carried out in an aqueous medium in the presence of an emulsifier and a free radical generating polymerization initiator at a temperature of from 0° C. to 100° C. in the substantial absence of molecular oxygen.

The copolymers of olefinic nitriles useful in this invention are those produced by polymerizing a major proportion of a monounsaturated nitrile, such as acrylonitrile, and a minor proportion of another monovinyl monomer component copolymerizable with said nitrile, optionally in the presence of a diene rubber which may be a homopolymer or a copolymer of a conjugated diene monomer.

The olefinically unsaturated nitriles most useful in the present invention are the alpha, beta-olefinically unsaturated mononitrile having the structure:

$$CH_2=C-CN$$
$$|$$
$$R$$

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monovinyl monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers, and others.

The esters of olefinically unsaturated carboxylic acids include those having the structure:

$$CH_2=C-COOR_2$$
$$|$$
$$R_1$$

wherein $R_1$ is hydrogen, an alkyl group having from 1 to 30 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

$$CH_2=C$$
$$/\ \backslash$$
$$R_3\ \ R_4$$

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate.

The vinyl aromatic monomers include styrene, alpha-methyl styrene, the vinyl toluenes, the vinyl xylenes and the like. Most preferred is styrene.

As discussed above, the instant polymeric system may optionally include a preformed diene rubber which be a homopolymer or copolymer of a conjugated diene monomer. The conjugated monomers useful in the present invention include butadiene-1,3, isoprene, chloroprene, bromoprene, cyanoprene, 2,3-dimethyl butadine-1,3, 2-ethyl butadiene-1,3, 2,3-diethyl butadiene-1,3 and the like. Most preferred for the purposes of this invention are butadiene-1,3 and isoprene because of their ready availability and their excellent polymerization properties. These conjugated diene monomers can be copolymerized with a monovinyl monomer component described above.

Preferably, the nitrile copolymer used in this invention is prepared by the polymerization of 100 parts by weight of (A) from 60% to 90% of:

$$CH_2{=}C{-}CN$$
$$|$$
$$R$$

wherein R has the foregoing designation, and (B) from 10% to 40% by weight based on the combined weights of (A) and (B) of at least one member selected from the group consisting of (1) styrene, (2) an ester having the structure:

$$CH_2{=}C{-}COOR_2$$
$$|$$
$$R_1$$

wherein $R_1$ and $R_2$ have the foregoing respective designations, (3) an alpha-olefin having the structure:

$$CH_2{=}C{<}^{R_3}_{R_4}$$

wherein $R_3$ and $R_4$ have the foregoing respective designations, (4) a vinyl ether selected from the group consisting of methyl vinyl ether, ethyl vinyl ether, the propyl vinyl ethers, and the butyl vinyl ethers, (5) vinyl acetate, and (6) indene. These nitrile copolymers are in the presence of from 0 to 40 parts by weight of (C) a rubbery copolymer of a conjugated diene monomer selected from the group consisting of butadiene and isoprene and optionally at least one comonomer selected from the group consisting of styrene, a nitrile monomer having the structure:

$$CH_2{=}C{-}CN$$
$$|$$
$$R$$

wherein R has the foregoing designation, and an ester having the structure:

$$CH_2{=}C{-}COOR_2$$
$$|$$
$$R_1$$

wherein $R_1$ and $R_2$ have the foregoing respective designations, said rubbery polymer containing from 50% to 100% by weight of polymerized conjugated diene and from 0% to 50% by weight of a comonomer.

More preferred copolymers are prepared by the polymerization of at least 70 parts by weight of (A) and less than 30 parts by weight of (B). It is also preferable to include between 5 and 15 parts by weight of (C).

A benzoate or acetate ester of a polyfunctional hydroxy containing compound has been found to be useful as a lubricant for the above high nitrile copolymers. This ester can be formed by adding either benzoic acid chloride or acetic acid chloride to a polyfunctional hydroxy containing compound. The polyfunctional hydroxy containing compound is a compound which contains at least two hydroxy groups. Preferred are the diols, which contain two hydroxy groups per compound. Examples of these lubricants include the benzoate and acetate esters of hydroquinone, resorcinol, o,o'-biphenol, pentaerythritol and ethylene glycol.

These lubricants can be dispersed in the high nitrile resins of this invention in any one of a number of ways which are well known to those skilled in the art. The dispersions can be made in an extruder, an internal mixer such as a Banbury or Brabender, and dispersion can be made by adding the lubricant to the polymer latex or dispersion or solution. Dispersions can also be made by adding the lubricant to the powdered oil-granular resin in a high speed mixer.

The compositions produced by following the disclosure of the present invention are useful thermoplastic materials which can be modified into containers, pipes, rods, films, sheets, fibers, and the like, to be used for packaging, storing and transporting solids, liquids and gases of various types.

This invention is further illustrated in the following examples wherein the amounts of ingredients are expressed in parts by weight unless otherwise indicated.

COMPARATIVE EXAMPLE A

A. A rubber latex was prepared by polymerizing with continuous agitation at 45° C. in the substantial absence of oxygen a mixture of the following ingredients:

|  | Parts |
|---|---|
| Acrylonitrile | 40.0 |
| Butadiene-1,3 | 60.0 |
| GAFAC RE-610[1] (emulsifier)* | 2.4 |
| Azo-bis-isobutyronitrile | 0.3 |
| t-Dodecyl mercaptan | 0.5 |
| Water | 200.0 |

*Which is a mixture of $R{-}O{-}(CH_2CH_2O{-})_nPO_3M_2$ and $[R{-}O{-}(CH_2C{-}H_2O{-})_n]_2PO_2M$ wherein n is a number from 1 to 40, R is an alkyl or alkaryl group and preferably a nonyl phenyl group and M is hydrogen, ammonia or an alkali metal, which composition is sold by the General Aniline and Film Corp.

Before the reaction was started the pH of the mixture was adjusted to about 8 with KOH. The polymerization was carried out for 22½ hours to a conversion of 92% and a total solids of 33.1%.

B. A high impact, gas barrier resin embodied in this invention was prepared by polymerization of a mixture of the following ingredients:

|  | Parts |
|---|---|
| Acrylonitrile | 75.0 |
| Methyl acrylate | 25.0 |
| Latex A (above) | 31.9 |
| Potassium persulfate | 0.06 |
| GAFAC RE-610 (emulsifier) | 3.0 |
| n-Dodecyl mercaptan | 1.0 |
| Ethylene diamine tetracetic Acid (versene acid) | 0.05 |
| Water | 200.0 |

The pH was adjusted to about 7 with KOH. The polymerization was carried out in the substantial absence of oxygen at 60° C. for 20 hours so as to produce a conversion of 97% of a latex having 33% solids. The polymer was isolated from this latex by coagulation with dilute aqueous aluminum sulfate. The polymer was then washed with water and dried.

50 grams of this polymer was added to a Brabender Plasticorder set at 210° C. and 35 rpm. The material was masticated for 15 minutes, with samples being removed every 3 minutes and the torque recorded. The 12 minute torque reading was 1560 meter grams. The masticated resin was then removed and compression molded into a test bar for physical properties. This was done by taking 10 grams of the masticated nitrile rubber modified copolymer and placing it into a bar mold. The bar mold was heated to 375° F., and pressured to 10,000 pounds.

The molded bar was transparent, and was found to have a notched izod impact value of 1.53 ft./lbs. per inch of notch, and ASTM heat distortion temperature of 75° C., a flexural strength of 14,310 psi and a flexural modulus of 303,000 psi. The remaining masticated material was submitted for a 200° C. melt flow index which was 2.53 grams per 10 minutes.

EXAMPLE 1

5 grams of the tetracetate of pentaerythritol was thoroughly mixed with 45 grams of the nitrile rubber modified copolymer produced in Comparative Example A. This blend was Brabendered at 210° C., and after 12 minutes, the torque was 940 meter grams. The melt index was 8.44 grams per 10 minutes and the notched izod was 2.89 ft./lbs. per inch.

EXAMPLE 2

The procedure of Example 1 was repeated using 5 grams of the diacetate ester of o,o'-biphenol in place of the tetraacetate of pentaerythritol. This mixture, when Brabendered at 210° C., gave a torque of 1,040 meter grams and a melt index of 4.19 grams per 10 minutes. The notched izod for this resin was 2.03 ft./lbs. per inch.

EXAMPLE 3

The procedure of Example 1 was repeated using 5 grams of diacetate ester of resorcinol in place of the 5 grams of tetraacetate of pentaerythritol. The resulting mixture, when Brabendered at 210° C., gave a 12 minute torque of 800 meter grams and a melt index of 12.27 grams per 10 minutes.

EXAMPLE 4

The procedure of Example 1 was repeated using 5 grams of diacetate ester of hydroquinone in place of the pentaerythritol. This mixture, when Brabendered at 210° C., gave a 12 minute torque of 880 meter grams and a melt index of 10.94 grams per 10 minutes.

EXAMPLE 5

The procedure of Example 4 was repeated except that 1 gram of the diacetate ester of hydroquinone and 49 grams of the nitrile rubber modified copolymer were used. This blend was Brabendered for 12 minutes at 210° C. and a torque of 1,280 meter grams resulted.

EXAMPLE 6

The procedure of Example 4 was repeated using 2.5 grams of the diacetate ester of hydroquinone and 47.5 grams of the nitrile rubber modified copolymer. This mixture was masticated as previously described and a 12 minute torque of 1,080 was obtained. The melt index of this material was 6.01 grams per 10 minutes.

EXAMPLE 7

The procedure of Example 1 was repeated using 5 grams of the dibenzoate ester of ethylene glycol in place of the pentaerythritol. This mixture, when Brabendered at 210° C., gave a 12 minute torque of 960 meter grams.

EXAMPLE 8

The procedure of Example 1 was repeated using 5 grams of the dibenzoate ester of 2-butene-1,4-diol in place of the pentaerythritol. This mixture, when Brabendered at 210° C., gave a 12 minute torque of 1,200 meter grams.

COMPARATIVE EXAMPLE B

Dioctyl phthalate is a common easily available processing aid for many polymers and was chosen for these reasons to be used as a basis of comparison for the acetate esters.

47.5 grams by weight of the nitrile rubber modified copolymer produced in Comparative Example A and 2.5 grams of dioctyl phthalate were mixed by a metal spatula. This material was poured into the Brabender Plasticorder and masticated for 15 minutes in the manner explained in Example 1. The 12 minute torque was 1,420 meter grams and the melt index was 2.27 grams per 10 minutes.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

We claim:

1. A composition which comprises an intimate mixture of (1) a copolymer produced by the polymerization of a major proportion of a monounsaturated nitrile and a minor portion of another monovinyl monomer component copolymerizable therewith in the presence of a preformed diene rubber; and (2) a lubricant selected from the group consisting of an diacetate ester of hydroquinone or an diacetate ester of resorcinol.

2. The composition of claim 1 wherein the copolymer comprises (A) from 60% to 90% by weight of at least one nitrile having the structure:

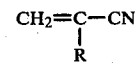

wherein R is hydrogen, a lower alkyl group having from 1 to 4 carbon atoms, or a halogen, and (B) from 10% to 40% by weight based on the combined weights of (A) and (B) of at least one member selected from the group consisting of (1) an ester having the structure:

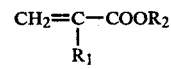

wherein $R_1$ is hydrogen, an alkyl group having from 1 to 30 carbon atomms, or a halogen, and $R_2$ is an alkyl group having from 1 to 6 carbon atoms, (2) an alpha-olefin having the structure:

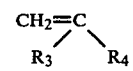

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure:

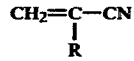

wherein R has the foregoing designation, and an ester having the structure:

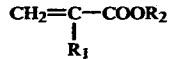

wherein $R_1$ and $R_2$ have the foregoing respective designations, said rubbery polymer containing from 50% to 100% by weight of polymerized conjugated diene and from 0% to 40% by weight of comonomer.

3. The composition of claim 2 wherein (A) is acrylonitrile.

4. The composition of claim 2 wherein (B) is methyl acrylate.

5. The composition of claim 2 wherein (B) is styrene.

6. The composition of claim 1 wherein the lubricant is the acetate ester of hydroquinone.

7. The composition of claim 1 wherein the lubricant is the acetate ester of resorcinol.

* * * * *